United States Patent
Tsujikawa et al.

(10) Patent No.: US 6,944,113 B2
(45) Date of Patent: Sep. 13, 2005

(54) METHOD OF CONTROLLING LASER DIODE IN OPTICAL DISK PLAYER AND CIRCUIT THEREFOR

(75) Inventors: Toshiaki Tsujikawa, Tokyo (JP); Masataka Saitoh, Yamagata-ken (JP)

(73) Assignees: Nippon Precision Circuits Inc., Tokyo (JP); Matsushita Electric Industrial Co., Ltd., Osaka (JP)

(*) Notice: Subject to any disclaimer, the term of this patent is extended or adjusted under 35 U.S.C. 154(b) by 834 days.

(21) Appl. No.: 09/871,186

(22) Filed: May 31, 2001

(65) Prior Publication Data

US 2004/0042359 A1 Mar. 4, 2004

(30) Foreign Application Priority Data

Jun. 5, 2000 (JP) .......................................... 2000-167903
May 24, 2001 (JP) .......................................... 2001-155995

(51) Int. Cl.[7] .................................................. G11B 7/00
(52) U.S. Cl. ...................................... 369/116; 369/47.5
(58) Field of Search ................................ 369/116, 47.5, 369/47.51, 47.55, 122

(56) References Cited

U.S. PATENT DOCUMENTS 5,042,022 A  8/1991  Ogawa
5,070,496 A  12/1991  Ogawa et al.
6,205,098 B1 * 3/2001  Miyamoto et al. ........ 369/47.35

FOREIGN PATENT DOCUMENTS

JP  63-257928  10/1988
JP  5-120717  5/1993

* cited by examiner

Primary Examiner—Nabil Hindi
(74) Attorney, Agent, or Firm—Jordan and Hamburg LLP

(57) ABSTRACT

Electric power consumed by a laser diode when an optical disk or magneto-optical disk is played back is reduced. A laser diode control circuit (6) causes the laser diode to emit continuously rather than intermittently, even if a PCK signal is supplied to the laser diode control circuit (6), when an optical display player or magneto-optical disk drive does not yet stabilize and is being pulled into a phase-locked state. When the focus is locked, the player is in a phase-locked state, and the operation is stable, a mode-switching circuit (9) included in the laser diode control circuit (6) switches the mode of operation from continuous operation to intermittent operation according to an FLOCK signal. The frequency of the PCK is multiplied by a frequency multiplier circuit (7), and the pulse width is adjusted by a pulse width-adjusting circuit (8). A laser diode driver circuit (10) produces intermittent current of this adjusted pulse width. The laser diode is started to emit intermittently.

10 Claims, 5 Drawing Sheets

Ton : LD ON TIME
Toff : LD OFF TIME

METHOD OF CONTROLLING LASER DIODE IN OPTICAL DISK PLAYER AND CIRCUIT THEREFOR

BACKGROUND OF THE INVENTION

1. Field of the Invention

The present invention relates to a method of controlling a laser diode that can be used in various optical disk players and playback only type magneto-optical disk drivers including compact disk (CD) players, portable CD players, playback only type MiniDisk (MD) players, playback only type portable MD players, digital versatile disk (DVD) players, and portable DVD players. The invention also relates to an electric circuit for such a laser diode. More particularly, the invention relates to a method and circuit capable of switching the mode of operation of such a laser diode between continuous emission and intermittent emission.

2. Description of the Related Art

In the prior art method and circuit for controlling a laser diode for use in an optical disk player, optical disk drive, or magneto-optical drive, the laser diode is constantly supplied with an electric current to achieve continuous emission in data playback operation. For example, although in Japanese Unexamined Patent Publication No. 7-262590/1995 (counterpart of U.S. Pat. No. 5,548,573), various methods for controlling a LD are disclosed, they all constantly supply an electric current to the LD in data playback operation.

With these prior arts laser diode (LD) control circuit, the laser diode is driven to emit continuously. Therefore, it has been impossible to reduce the electric power consumed by the laser diode.

SUMMARY OF THE INVENTION

Accordingly, it is an object of the present invention to provide a method and circuit for minimizing the current consumed by a laser diode by causing it to emit intermittently when a phase-locked loop (PLL) for separating data is locked according to a data signal read from an optical disk, the PLL creating a data playback clock signal for data playback.

To achieve the above-described object, a method of controlling a laser diode for use in an optical disk player in accordance with the present invention consists of controlling the light emitted from the laser diode in such a way that the light is turned off in synchronism with a data playback clock signal that is created from a data signal read from the optical disk.

In this method, the laser diode consumes no electric power while ceasing to emit light. Consequently, the electric power consumption can be reduced to a minimum.

The embodiment of the invention as set forth in claim 2 is characterized in that the laser diode is switched from continuous operation to intermittent operation after the data playback clock signal has stabilized. The optical disk player starts to operate well. Then, the power consumption is reduced to a minimum.

The embodiment of the invention as set forth in claim 3 is characterized in that the laser diode is switched from continuous operation to intermittent operation according to a focus lock signal produced when the laser light directed to the disk surface is brought to a focus. The light is brought to a focus during continuous operation of the laser diode. Then, the mode of operation is switched to intermittent emission. In this way, the player is allowed to start operating smoothly. Then, the power consumption is reduced to a minimum.

The embodiment of the invention as set forth in claim 4 is characterized in that the laser diode is switched from intermittent operation to continuous operation according to a mute signal obtained when sound is muted. When sound is no longer muted, the laser diode is quickly switched to intermittent operation. Then, the power consumption can be reduced to a minimum.

The embodiment of the invention as set forth in claim 5 is characterized in that in the various states described above, the light emitted from the laser diode is turned off in synchronism with a signal obtained by multiplying the data playback clock signal created from the data signal, which is read from the optical disk. The reproducibility of the data signal that is played back using the intermittently emitting laser diode can be enhanced further.

The embodiment of the invention as set forth in claim 6 is characterized in that in the various states described above, the ratio of the ON time during which the laser diode is made to emit to the OFF time during which the laser diode is not made to emit is changed to any arbitrary value. This ratio of ON time duration to OFF time duration can be set at will, taking account of the capabilities of the playback circuit and other factors.

The laser control circuit for an optical disk player as set forth in claim 7 comprises: a frequency multiplier circuit for receiving a data playback clock signal created from a data signal that is read from the optical disk and multiplying the data playback clock signal; a pulse width-adjusting circuit for adjusting the ratio of the width of ON pulse of the output signal from the frequency multiplier circuit to the width of OFF pulse to an arbitrary value; a mode-switching circuit for receiving the output signal from the pulse width-adjusting circuit and a focus lock signal produced when laser light directed to the disk surface is brought to a focus, as well as a mute signal obtained when sound is muted, and for switching the mode of operation of the laser diode between continuous operation and intermittent operation in which the laser diode emits intermittently according to the output signal from the pulse width-adjusting circuit; a laser diode driver circuit for controlling emission of the laser diode according to the output from the mode-switching circuit; and a laser diode, whose emission is controlled by a laser diode driver circuit. The mode-switching circuit switches the laser diode from continuous operation to intermittent operation according to the focus lock signal produced when the laser light directed to the disk surface is brought to a focus, and switches the laser diode from intermittent operation to continuous operation according to the mute signal obtained when sound is muted.

Because of this structure, the laser diode consumes no electric power while ceasing to emit light. In consequence, the power consumption can be reduced to a minimum. Furthermore, because the laser diode is switched from continuous operation to intermittent operation according to the focus lock signal produced when the laser light directed to the disk surface is brought to a focus, the laser diode is permitted to start operating smoothly by switching the diode to intermittent operation after the light is brought to a focus during continuous operation. Then, the power consumption can be reduced to a minimum.

Additionally, the laser diode is switched from continuous operation to intermittent operation according to the mute signal produced when sound is muted. Therefore, when sound is no longer muted, the laser diode is quickly switched to intermittent operation. Then, the power consumption can be decreased to a minimum. In the various states described above, the light from the laser diode is turned off in synchronism with a signal created by multiplying the data playback clock signal by a factor of n, the data playback clock signal being created from the data signal that is read from the optical disk. Therefore, high reproducibility of the data signal played back using the continuously emitting laser diode is achieved by intermittently emitting laser diode.

DESCRIPTION OF THE PREFERRED EMBODIMENTS

The present invention is hereinafter described in detail using the preferred embodiments illustrated in the accompanying drawing.

Embodiment 1

Figure 1:
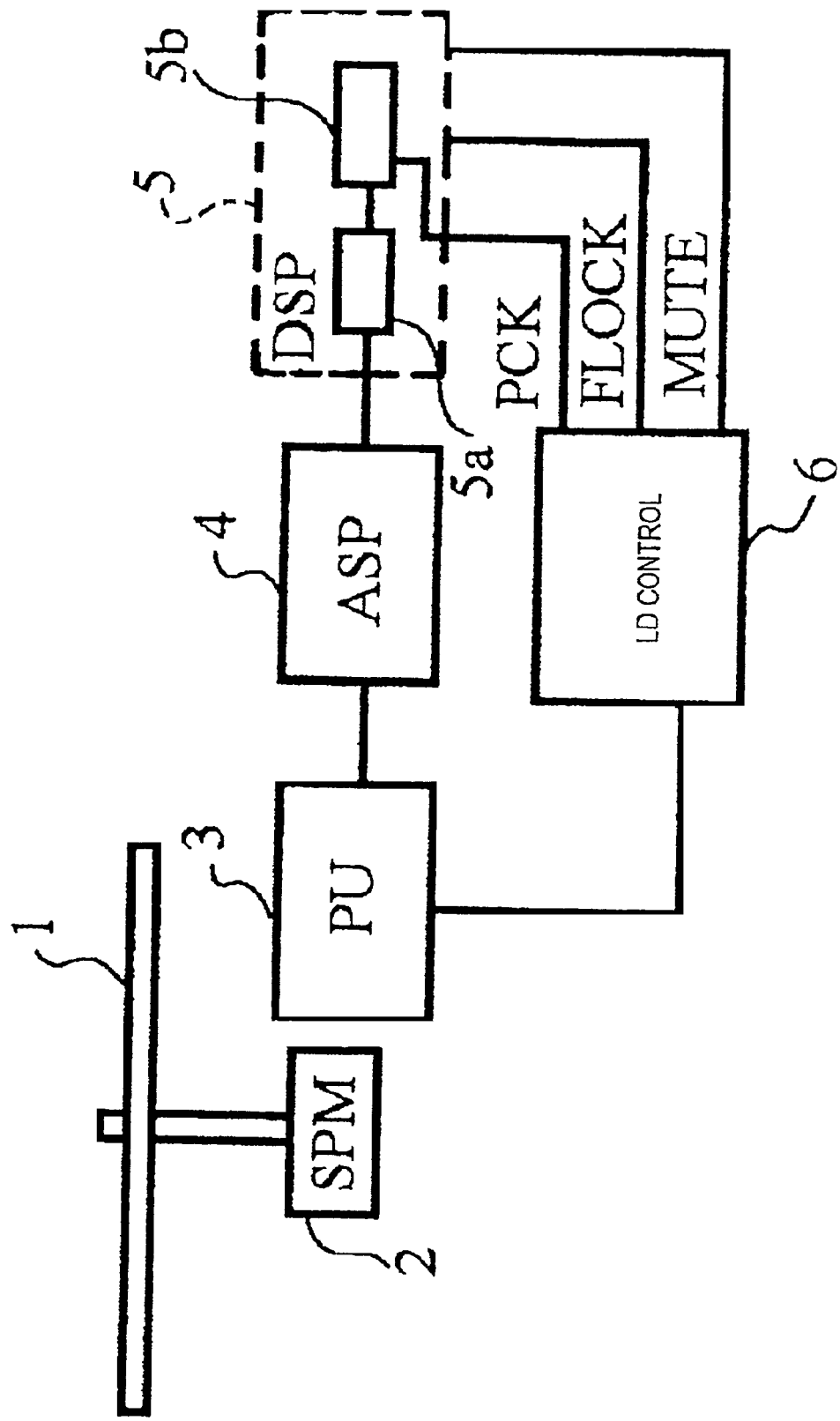
FIG. 1 is a block diagram showing the configuration of a player in accordance with Embodiment 1 of the present invention.
Figure 2:
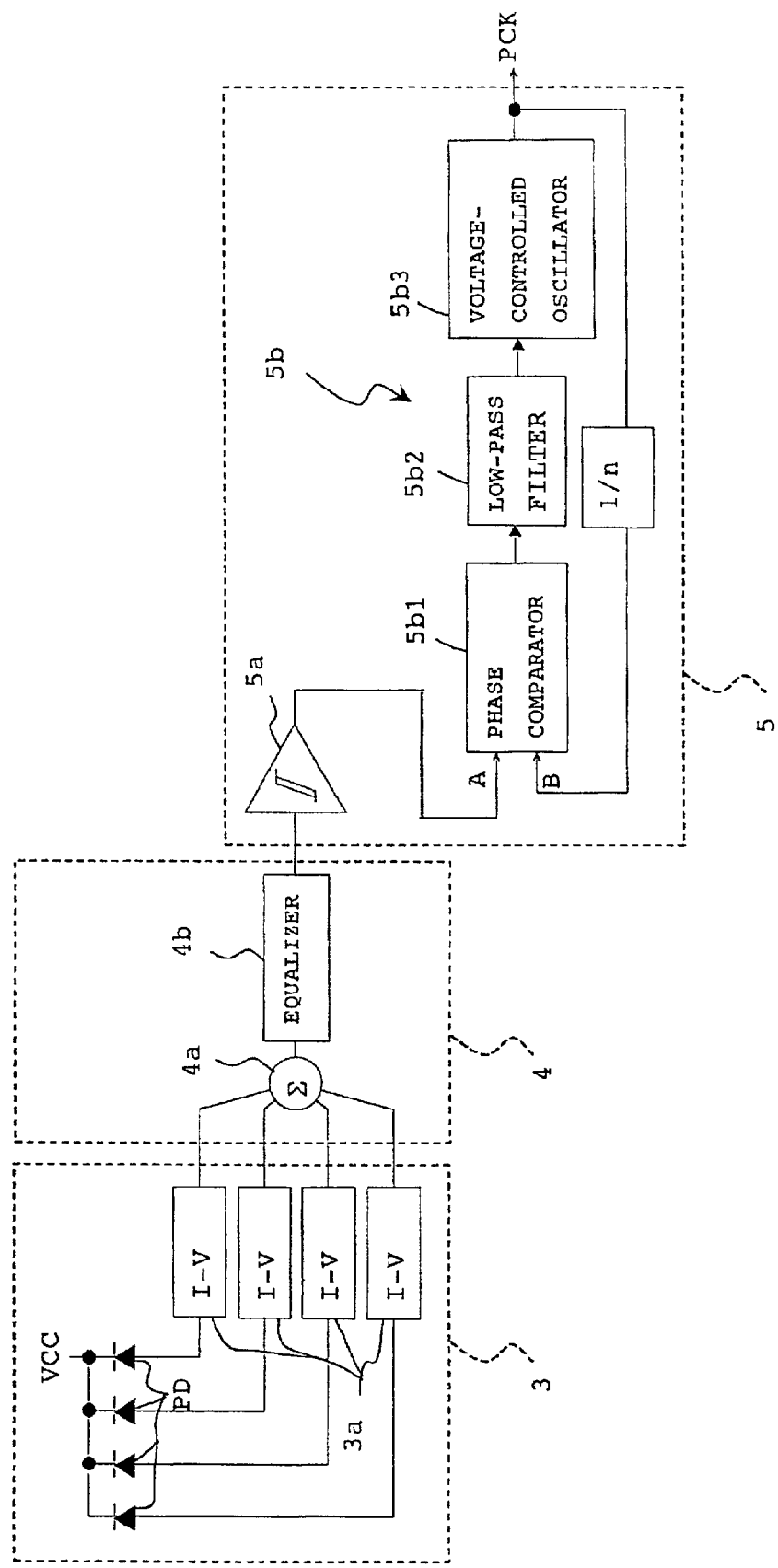
FIG. 2 is a block diagram of a laser diode control circuit in accordance with Embodiment 1 of the invention.
Figure 3:
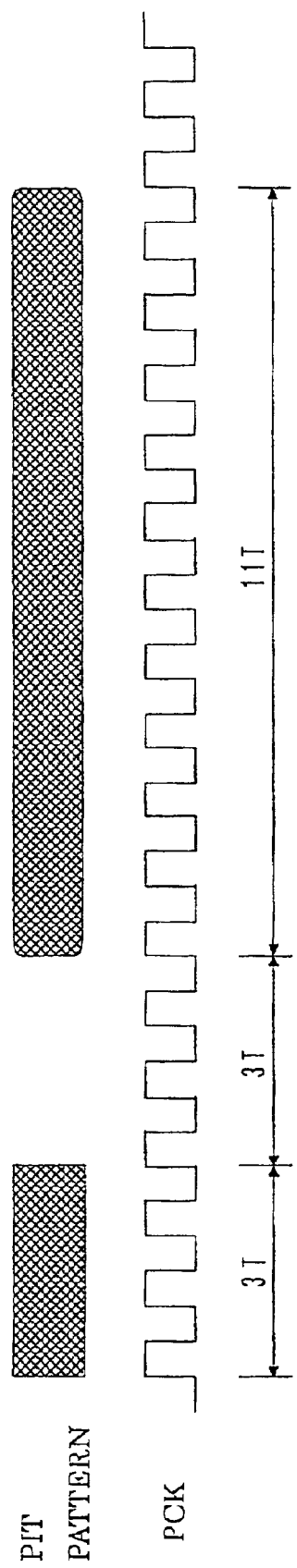
FIG. 3 is an explanation diagram for explaining a relation between a playback clock signal and a pit pattern.
Figure 4:
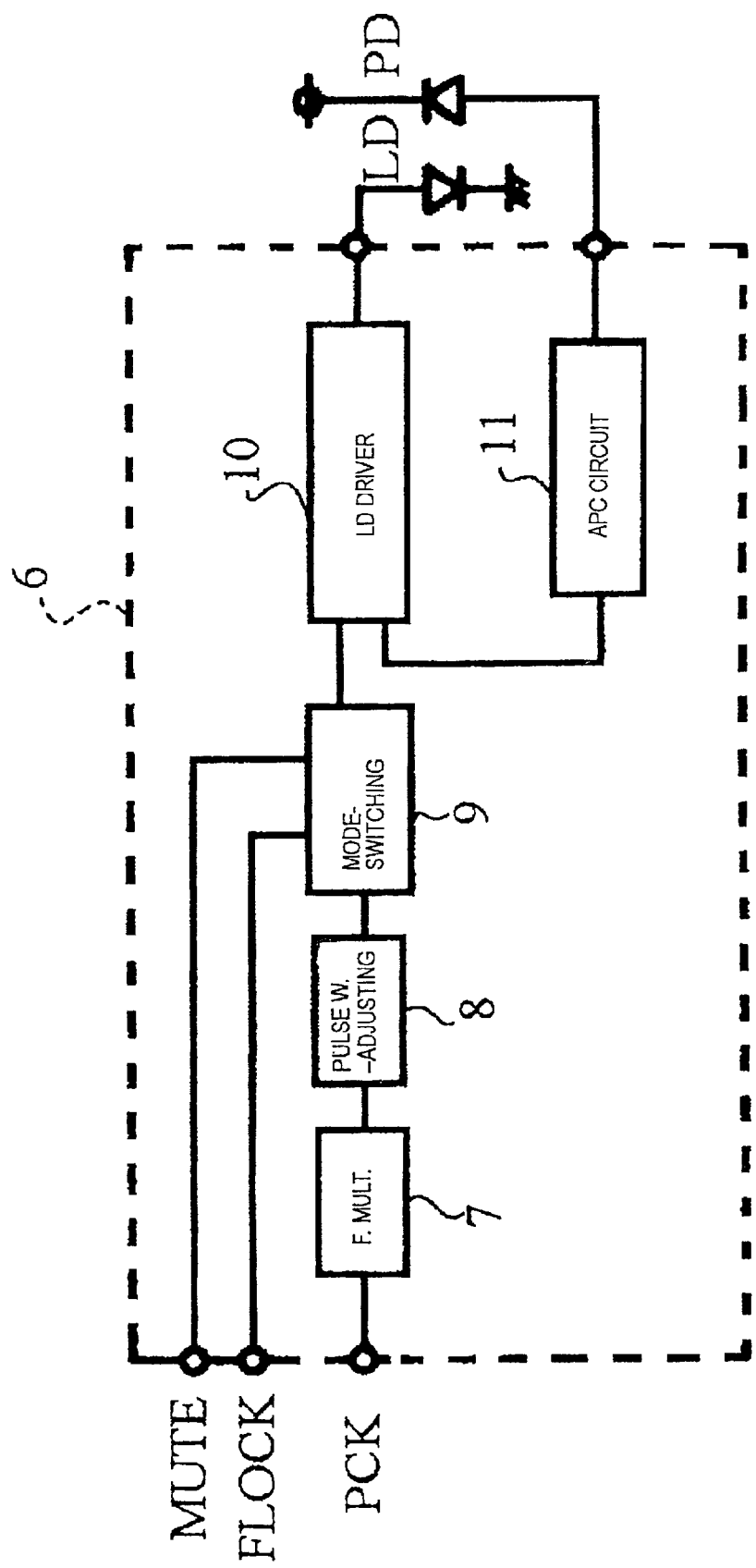
FIG. 4 is a block diagram of a laser diode control circuit in accordance with Embodiment 1 of the invention.
Figure 5:
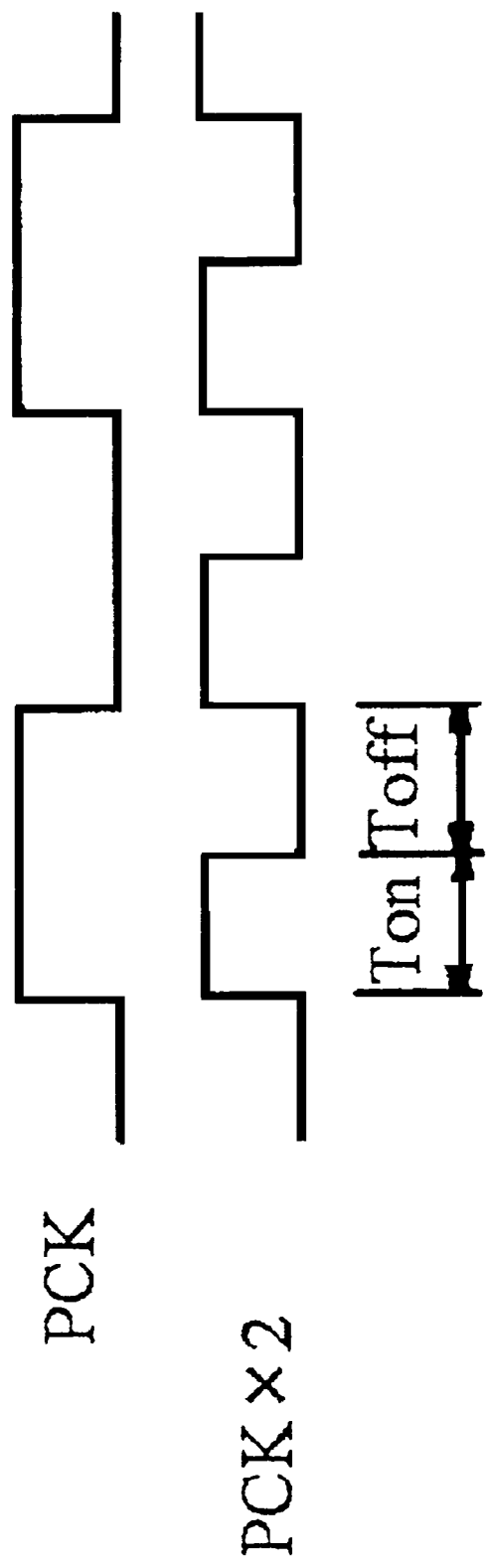
FIG. 5 is a waveform diagram illustrating the waveform of an electric current that is turned off in accordance with Embodiment 1 of the invention.

FIG. 1 is a block diagram showing the configuration of a player in accordance with Embodiment 1 of the invention. FIG. 2 is a block diagram of a laser diode control circuit in accordance with Embodiment 1 of the invention. FIG. 3 is an explanation diagram for explaining a relation between a playback clock signal and a pit pattern. FIG. 4 is a block diagram of a laser diode control circuit in accordance with Embodiment 1 of the invention. FIG. 5 is a waveform diagram illustrating the waveform of an electric current that is turned off in accordance with Embodiment 1 of the invention.

An optical disk, magneto-optical disk, or other similar disk 1 is rotationally driven by a spindle motor (SPM) 2. An optical pickup 3 comprises a laser diode (LD) emitting laser light, a photodiode (PD) for detecting the light that is emitted from the laser diode and reflected by the disk 1 and for converting the light into electric current, and a head amplifier for converting the current into voltage. For convenience's sake, One LD and PD are only shown in FIG. 1, the invention is not limited to this.

An optical data signal that is reflected from the disk 1 while the laser diode is used as a light source is converted from light into electric current by the photodiode and then converted into voltage by the head amplifier. The voltage signal from the head amplifier is sent to an analog signal-processing circuit (ASP) 4, where calculations of sum and difference are performed. The produced sum signal is binarized by a comparator 5a in a digital signal-processing circuit (DSP) 5 using a microcomputer or the like. The binarized signal is input to a PLL (phase-locked loop) circuit 5b for data separation. This PLL circuit 5b for data separation creates a data playback clock (PCK) signal from the binarized signal arising from played back data and sends the PCK signal to a data playback circuit (not shown) and to a laser diode (LD) control circuit 6.

The PCK signal is produced in synchronism with reading of data marks, or so-called pits, on the disk 1. Because the laser diode is driven to emit intermittently in synchronism with the PCK signal described above, each pit can be read reliably even with the laser diode emitting intermittently. Consequently, in the present embodiment, the power consumption can be reduced while assuring reliable reading of data.

The structure for generating the PCK signal is described in detail. As shown in FIG. 2, a PU 3 is equipped with four PDs (photodiodes) for detecting a server signal from a disk 1. These PDs convert currents into voltages by four head amplifiers 3a, respectively. The voltage signals are summed up by an adder circuit 4a in an analog signal-processing circuit (ASP) 4, thus producing a summation signal. The amplitude of the summation signal is made uniform by an equalizer circuit 4b and then sent to a comparator 5a in a DSP 5 to binarize the signal. A PLL 5b for data separation uses a phase comparator 5b1 to compare data signal A delivered from the comparator 5a with a signal B produced by frequency-dividing the PCK signal by a given number n (e.g., n=4) in terms of their phase. This comparator output is used as a control voltage for a voltage-controlled oscillator 5b3 via a low-pass filter 5b2. This oscillator 5b3 produces the PCK signal. The PLL 5b for data separation pulls the signals into a phase-locked state. That is, the PLL acts to bring the data signal A and the signal B into coincidence in phase. Thus, the PCK signal is produced in synchronism with the data signal A, i.e., the pit pattern.

Let us assume that the disk 1 is a CD. Usually, the PCK signal has the fundamental frequency 4.3128 MHz of an EFM (eight to fourteen modulation) signal in a CD player system. That is, if it is assumed that one period of the PCK signal is T channel bits, data mark on the disk 1 (i.e., so-called an EFM signal owing to the pit pattern) can assume channel bits of 3T to 11T, as shown in FIG. 3. As mentioned previously, EFM data are recorded as pits on the disk 1. The pit length is set to any one of 3T, 4T, . . . , 10T, and 11T, depending on the data contents. Those portions which have no pits are meaningful in terms of data. The length lies from 3T to 11T. The rising timing and the falling timing of the data signal A give the time interval of the pit length read out. The disk 1 is so recorded that the DSV (digital sum value) of a given number of bits of data takes a given value. The PCK signal having a given frequency corresponding to the rotational speed of the disk 1 can be extracted on a long-term basis. By using this PCK signal as a reference, the frequency at which the LD is intermittently driven in synchronism with the rotational speed of the disk 1 can be modified. Therefore, the relation between the data-reading frequency and the frequency at which the LD is intermittently driven can be maintained constant. This permits reliable reading of data.

Where the frequency of the data signal A is high on a short-term basis (i.e., when reading successive locations of the pit pattern of pit length 3T), the amplitude of the summation signal is lower than where the frequency of the data signal A is low (i.e., pit patterns of pit length 11T are arrayed at intervals of 11T (the roughest pattern). To eliminate variations of the amplitude of the summation signal due to frequencies of the data signal A, the aforementioned equalizer circuit 4b adjusts the amplitude of the signal according to the frequency such that the summation signal is matched to the amplitude of the roughest pattern.

In the laser diode control circuit 6 of FIG. 4, a frequency multiplier circuit 7 has a function of multiplying the input PCK signal. In this embodiment, the multiplier circuit multiplies the signal by a factor of 2. A pulse width-adjusting circuit 8 adjusts the pulse width of the ON period (Ton) of the PCK signal multiplied by a factor of 2 by the frequency multiplier circuit 7 as shown in FIG. 5. As the pulse width is increased, the signal is played back with higher reproducibility but saving in power consumption can be achieved to a lesser extent. A mode-switching circuit 9 receives a focus lock (FLOCK) signal and a mute (MUTE) signal and switches the mode of operation of the laser diode between continuous operation and intermittent operation. A laser diode (LD) driver circuit 10 drives the laser diode such that it emits. An APC circuit 11 has a detector circuit for detecting the current detected by the photodiode (PD), which detects light reflected from the disk, and producing an output signal. The LD driver circuit feeds the output light back to the LD driver circuit (i.e., negative feedback is provided) to maintain constant the optical output from the laser diode (LD).

The operation is next described by referring to the drawing. When a disk is loaded into the optical disk player, optical disk drive, or magneto-optical drive, or when the power supply is turned on after a disk has been loaded, the laser diode control circuit 6 does not permit intermittent operation of the laser diode but causes it to emit continuously, even if the PCK signal is supplied to the laser diode control circuit 6, while the phase-locked loop (PLL) 5b for data separation is being pulled into a locked state i.e., when the operation of the optical disk player, optical disk drive, or magneto-optical drive has not yet stabilized.

When the laser light is focused onto the disk surface of the optical disk player, optical disk drive, or magneto-optical drive (i.e., focus locking is complete, the PLL 5b for data separation has successfully locked, and the operation has stabilized (that is, the PCK signal has stabilized)), the mode-switching circuit 9 of the laser diode control circuit 6 switches the mode of operation from continuous operation to intermittent operation according to the FLOCK signal. The pulse width of the multiplied output from the frequency multiplier circuit 7 is adjusted by the pulse width-adjusting circuit 8. The mode-switching circuit 9 causes the laser diode driver circuit 10 to produce an intermittent current having the pulse width adjusted by the adjusting circuit 8. Intermittently emitting operation of the laser diode is started.

Since the laser diode is driven to emit continuously until the PCK signal becomes stabilized, the PLL 5b for data separation is smoothly pulled into a locked state. It is assured that the optical disk player starts operating well. After the PCK signal has stabilized, the laser diode is driven to emit intermittently, thus reducing the power consumption.

The mute signal informing that the sound output from the DSP circuit 5 is stopped causes the mode-switching circuit 9 in the laser diode control circuit 6 to switch the mode of operation of the laser diode of the optical disk player, optical disk drive, or magneto-optical drive from intermittent operation to continuous operation. The laser diode driver circuit 10 switches the drive current supplied to the laser diode from intermittent current to constant current, driving the laser diode to emit continuously. During playback, the intermittent playback output is integrated by the ASP circuit 4 to play back the playback data signal.

Electric power Pd consumed by the prior art laser diode during data playback is given by $$Pd = Vdd \times ILD$$

Where the laser diode is driven to emit intermittently, the power consumption Pd is given by $$Pd = \frac{Ton}{Ton + Toff} \times Vdd \times ILD$$

where Ton is the time for which the laser diode is ON when it is driven to operate intermittently and Toff is the time for which the laser diode is OFF when it is driven to operate intermittently. In this way, the power consumption of the laser diode can be reduced by reducing the ratio of the time Ton to the time Toff. This ratio can be set at will, taking account of the performance of the playback circuit and other factors.

In this way, in the present embodiment, if the disk is stably driven and the FLOCK signal is obtained while the laser diode is being driven, then the drive current to the laser diode is switched from constant current to intermittent current. Therefore, the laser diode is driven to emit continuously at first. Consequently, smooth starting operation is attained. After stabilization, the laser diode current is reduced during data playback because of intermittent operation. Hence, the power consumption of the optical disk player, optical disk drive, or magneto-optical drive can be decreased.

On receiving the mute signal indicating that there is no sound, the drive current supplied to the laser diode is switched from intermittent current to constant current. Therefore, when the laser diode is no longer in the muted state in which the laser diode emits continuously, the mode of operation is quickly switched to intermittent emission. Then, the power consumption can be reduced to a minimum.

Embodiment 2

In Embodiment 1 described above, the PCK signal supplied to the frequency multiplier circuit 7 of the laser diode control circuit is multiplied by a factor of 2. If this multiplication factor is increased to 3, 4, . . . , n, then the reproducibility of the played back data signal can be enhanced further.

In the embodiments described above, the direction of current flowing through the laser diode driver circuit can be made to correspond to both anode- and cathode-grounded systems by operating the circuit as a source and sink.

As described thus far, in the laser diode control method and circuit for an optical disk player in accordance with the present invention, the laser diode is driven to emit intermittently in synchronism with a clock signal for data playback during data playback as set forth in claim 1. This assures reliable reading of data. At the same time, electric power consumption can be reduced.

Where the laser diode is switched from continuous operation to intermittent operation after the data playback clock signal has stabilized as set forth in claim 2, the optical disk player starts to operate well. Then, the power consumption can be reduced to a minimum.

Where the light is brought to a focus during continuous operation and then the mode of operation is switched to intermittent emission as set forth in claim 3, the player starts to operate smoothly. Then, the power consumption can be reduced to a minimum.

Where the laser diode is switched from intermittent operation to continuous operation according to a mute signal obtained when sound is muted as set forth in claim 4, the operation is quickly switched to intermittent emission when sound is no longer muted. Then, the power consumption can be reduced to a minimum.

Where light from the laser diode is turned off in synchronism with a signal obtained by multiplying a data playback clock signal by a factor of n, the data playback clock signal being created from a data signal read from an optical disk as set forth in claim 5, the reproducibility of the data signal played back using the laser diode emitting intermittently can be enhanced further.

Where the ratio of the ON time of the laser diode for which it is made to emit to the OFF time is varied at will as set forth in claim 6, the ratio can be set, taking account of the performance of the playback circuit and other factors.

What is claimed is:

1. A method of controlling a laser diode for use in an optical disk player, the laser diode reading a data signal from an optical disk, said method comprising the steps of:

creating a data playback clock signal from said data signal; and turning off light emitted from said laser diode in synchronism with said data playback clock signal;

wherein said light emmitted from said laser diode is turned off in synchronism with a signal obtained by multiplying said data playback clock signal created from said data signal that is read from said optical disk.

2. The method of controlling a laser diode for use in an optical disk player as set forth in claim 1, wherein said laser diode is switched from continuous operation to intermittent operation after said data playback clock signal has stabilized.

3. The method of controlling a laser diode for use in an optical disk player as set forth in claim 1 or 2, wherein said laser diode is switched from continuous operation to intermittent operation according to a focus lock signal produced when laser light is focused onto a surface of the disk.

4. The method of controlling a laser diode for use in an optical disk player as set forth in claim 1 or 2, wherein said laser diode is switched from intermittent operation to continuous operation according to a mute signal obtained when sound is muted.

5. The method of controlling a laser diode for use in an optical disk player as set forth in claim 1 or 2, wherein a ratio of an emitting time for said laser diode to a non-emitting time for said laser diode is arbitrarily variable.

6. A laser control circuit for an optical disk player, comprising:

a frequency multiplier circuit for receiving a data playback clock signal created from a data signal that is read from an optical disk and multiplying said data playback clock signal;

a pulse width-adjusting circuit for adjusting a ratio of the width of an ON pulse of an output signal from said frequency multiplier circuit to a width of an OFF pulse to an arbitrary value and for producing said ration as an output signal;

a mode-switching circuit for receiving said output signal from said pulse width-adjusting circuit; a focus lock signal produced when laser light directed to a surface of said disk is brought to a focus, and a mute signal obtained when sound is muted, and for switching a mode of operation of said laser diode between continuous operation and intermittent operation in which said laser diode emits intermittently according to said output signal from said pulse width-adjusting circuit, and for producing a mode-switching circuit output signal;

a laser diode driver circuit for controlling emission of said laser diode according to said mode-switching circuit output signal;

a laser diode, capable of emitting and whose emission is controlled by said laser diode driver circuit;

wherein said mode-switching circuit switches a mode of operation of said laser diode from continuous operation to intermittent operation according to a focus lock signal produced when said laser light directed to said disk surface is brought to a focus and switches said mode of operation of said laser diode from intermittent operation to continuous operation according to a mute signal obtained when sound is muted.

7. A laser control circuit for an optical disk player having a driver circuit for controlling emission of a laser diode for reading an optical disk, said laser control circuit comprising a frequency multiplier circuit for receiving a data playback clock signal created from a data signal that is read from said optical disk and multiplying said data playback clock signal;

wherein said driver circuit produces a drive signal for driving said laser diode according to an output signal from said frequency multiplier circuit to cause said laser diode to emit intermittently in synchronism with said data playback clock signal.

8. A method of controlling a laser diode for use in an optical disk player, the laser diode reading a data signal from an optical disk, said method comprising the steps of:

creating a data playback clock signal from said data signal; and turning off light emitted from said laser diode in synchronism with said data playback clock signal;

wherein said laser diode is switched from continuous operation to intermittent operation according to a focus lock signal produced when laser light is focused onto a surface of the disk.

9. A method of controlling a laser diode for use in an optical disk player, the laser diode reading a data signal from an optical disk, said method comprising the steps of:

creating a data playback clock signal from said data signal; and turning off light emitted from said laser diode in synchronism with said data playback clock signal;

wherein said laser diode is switched from intermittent operation to continuous operation according to a mute signal obtained when sound is muted.

10. A method of controlling a laser diode for use in a optical disk player, the laser diode reading a data signal from an optical disk, said method comprising the steps of:

creating a data playback clock signal from said data signal; and turning off light emitted from said laser diode in synchronism with said data playback clock signal;

wherein a ratio of an emitting time for said laser diode to a non-emitting time for said laser diode is arbitrarily variable.

* * * * *